(12) United States Patent
Hung (10) Patent No.: US 9,752,723 B2
(45) Date of Patent: Sep. 5, 2017

(54) DISPLAY SUPPORT DEVICE

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 0 days.

(21) Appl. No.: 15/356,867

(22) Filed: Nov. 21, 2016

(65) Prior Publication Data

US 2017/0152987 A1 Jun. 1, 2017

(30) Foreign Application Priority Data

Nov. 26, 2015 (TW) .............................. 104218981 U (51) Int. Cl.
*F16M 13/02* (2006.01)
*F16M 11/10* (2006.01)
*F16M 11/18* (2006.01)
*F16M 11/20* (2006.01)
*G06F 1/16* (2006.01)

(52) U.S. Cl.
CPC ............ *F16M 13/02* (2013.01); *F16M 11/10* (2013.01); *F16M 11/18* (2013.01); *F16M 11/2014* (2013.01); *F16M 11/2021* (2013.01); *F16M 2200/024* (2013.01); *F16M 2200/044* (2013.01); *F16M 2200/068* (2013.01); *G06F 1/1601* (2013.01)

(58) Field of Classification Search
CPC ........ F16M 13/02; F16M 11/10; F16M 11/18; F16M 11/2014; F16M 11/2021; F16M 2200/024; F16M 2200/044; F16M 2200/068; G06F 1/1601
See application file for complete search history.

(56) References Cited

U.S. PATENT DOCUMENTS

| 5,826,846 | A | * | 10/1998 | Buccieri | ............... F16M 11/10 248/278.1 |
| 5,975,472 | A | * | 11/1999 | Hung | ................... F16M 11/105 248/278.1 |
| 9,357,846 | B2 | * | 6/2016 | Hung | .................... G06F 1/1601 |
| 2004/0084587 | A1 | * | 5/2004 | Oddsen | .................. F16M 11/10 248/284.1 |
| 2011/0079692 | A1 | * | 4/2011 | Li | ........................ F16M 11/105 248/220.21 |

(Continued)

FOREIGN PATENT DOCUMENTS

TW          M393137 U1     11/2010

*Primary Examiner* — Anita M King
(74) *Attorney, Agent, or Firm* — Husch Blackwell LLP (57) ABSTRACT

A display support device includes a hollow hanging arm having a movable end portion, and a pressure cylinder movably disposed in the hanging arm and including a fixed rod that extends through a cylinder body thereof and that has an open end, and a control pin extending through the open end and having an end surface. A control unit is operable to control the control pin between a locking position, in which the end surface is flush with the open end and the cylinder body is immovable relative to the fixed rod, and an unlocking position, in which the end surface is spaced apart from the open end and the cylinder body is movable relative to the fixed rod. A carrier unit is pivotally connected to the movable end portion.

5 Claims, 7 Drawing Sheets

(56) References Cited

U.S. PATENT DOCUMENTS

2011/0315843 A1\* 12/2011 Hung .................. F16M 11/041
                                                        248/279.1
2013/0299658 A1\* 11/2013 Hung ..................... F16M 13/02
                                                        248/276.1

\* cited by examiner

DISPLAY SUPPORT DEVICE

CROSS-REFERENCE TO RELATED APPLICATION

This application claims priority to Taiwanese Utility Model Application No. 104218981, filed on Nov. 26, 2015.

FIELD

The disclosure relates to a support device, and more particularly to a display support device.

BACKGROUND

A conventional display support device, as disclosed in Taiwanese Utility Model Patent No. M393137, includes a hanging arm having a pivot end portion and a movable end portion opposite to the pivot end portion for mounting a display, and a pressure cylinder disposed in the hanging arm. The pressure cylinder is capable of providing a buffer force against the loads exerting thereon. To dispose the display mounted on the movable end portion at a desired position, an external force will be provided to move the hanging arm. After the display is moved to the desired position, the external force is released from the hanging arm. However, the buffer force from the pressure cylinder of the conventional display support device would make the hanging arm to pivot again, thereby causing the display to move away from the desired position.

SUMMARY

Therefore, an object of the present disclosure is to provide a display support device that can alleviate the drawback of the prior art.

According to the present disclosure, a display support device includes a hollow hanging arm, a pressure cylinder, a control unit, a carrier unit and a positioning unit.

The hollow hanging arm has a pivot end portion and a movable end portion opposite to the pivot end portion.

The pressure cylinder is movably disposed in the hanging arm, and includes a cylinder body, a fixed rod and a control pin. The cylinder body has a first end pivotally connected to the pivot end portion, and a second end opposite to the first end. The fixed rod axially extends through the second end of the cylinder body and has an open end opposite to the first end of the cylinder body. The control pin axially and movably extends through the open end of the fixed rod for controlling pressure change inside the cylinder body and having an end surface.

The control unit is operable to control movement of the control pin between a locking position, in which the end surface of the control pin is flush with the open end of the fixed rod and the cylinder body is immovable relative to the fixed rod, and an unlocking position, in which the end surface of the control pin is spaced apart from the open end of the fixed rod and the cylinder body is movable relative to the fixed rod.

The carrier unit is pivotally connected to the movable end portion.

The positioning unit is connected to the pivot end portion.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 6, a display support device 100 according to a first embodiment of the present disclosure includes a hollow hanging arm 1, a pressure cylinder 2, a control unit 3, a carrier unit 4 and a positioning unit 5.

The hollow hanging arm 1 has a pivot end portion 11 and a movable end portion 12 opposite to the pivot end portion 11.

Figure 4:
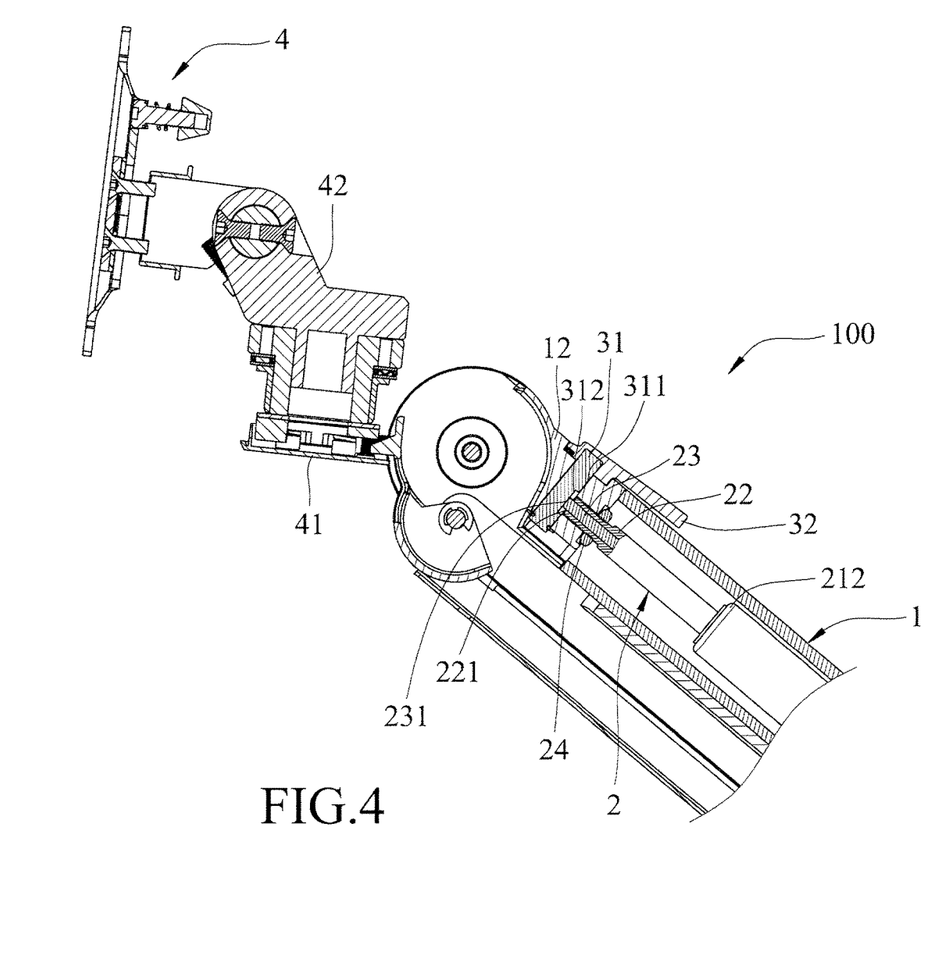
FIG. 4 is a fragmentary sectional view of the first embodiment, illustrating the control pin in the unlocking position.

The pressure cylinder 2 is movably disposed in the hanging arm 1, and includes a cylinder body 21, a fixed rod 22 and a control pin 23. The cylinder body 21 has a first end 211 pivotally connected to the pivot end portion 11 through a connecting element 10, and a second end 212 opposite to the first end 211. The fixed rod 22 axially extends through the second end 212 of the cylinder body 21 and has an open end 221 opposite to the first end 212 of the cylinder body 21. As shown in FIG. 4, the fixed rod 22 is fixed to the movable end portion 12 by a nut 24. It is worth to mention herein that the cylinder body 21 has at least two chambers (not shown). When a pressure difference exists between the two chambers of the cylinder body 21, the cylinder body 21 is axially moved relative to the fixed rod 22. When the pressure difference does not exist between the two chambers of the cylinder body 21, the cylinder body 21 is immovable relative to the fixed rod 22. Because the operation and structure of the pressure cylinder 2 are well known to a skilled artisan, details thereof are omitted herein for the sake of brevity.

The control pin 23 axially and movably extends through the open end 221 of the fixed rod 22 for controlling pressure change inside the cylinder body 21 and has an end surface 231.

The control unit 3 includes a rotary rod 31 extending transversely through the movable end portion 12, and an operating lever 32 fixed to the rotary rod 31 for controlling rotation of the rotary rod 31.

Figure 2:
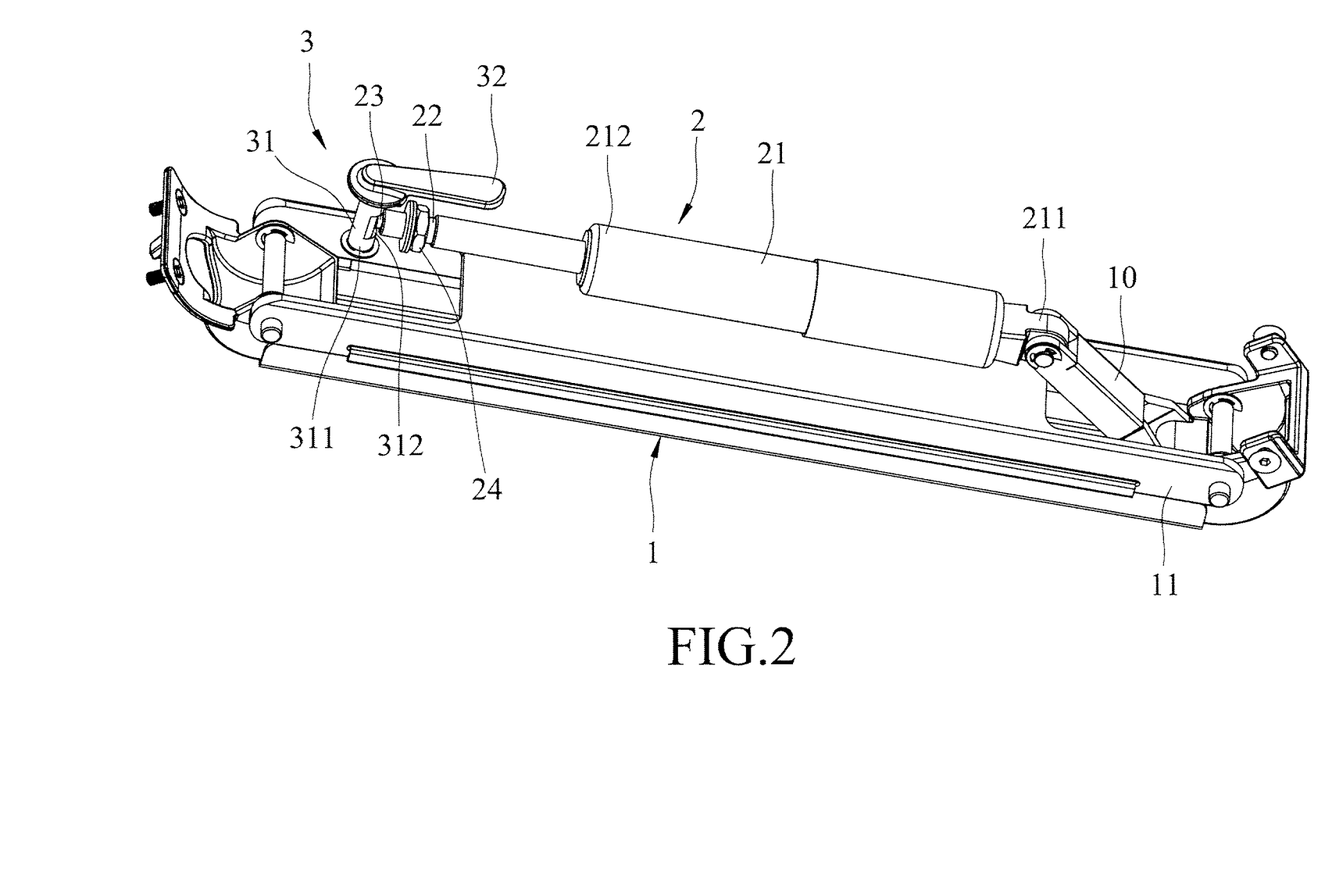
FIG. 2 is a perspective view of the first embodiment, illustrating a control pin in an unlocking position.
Figure 3:
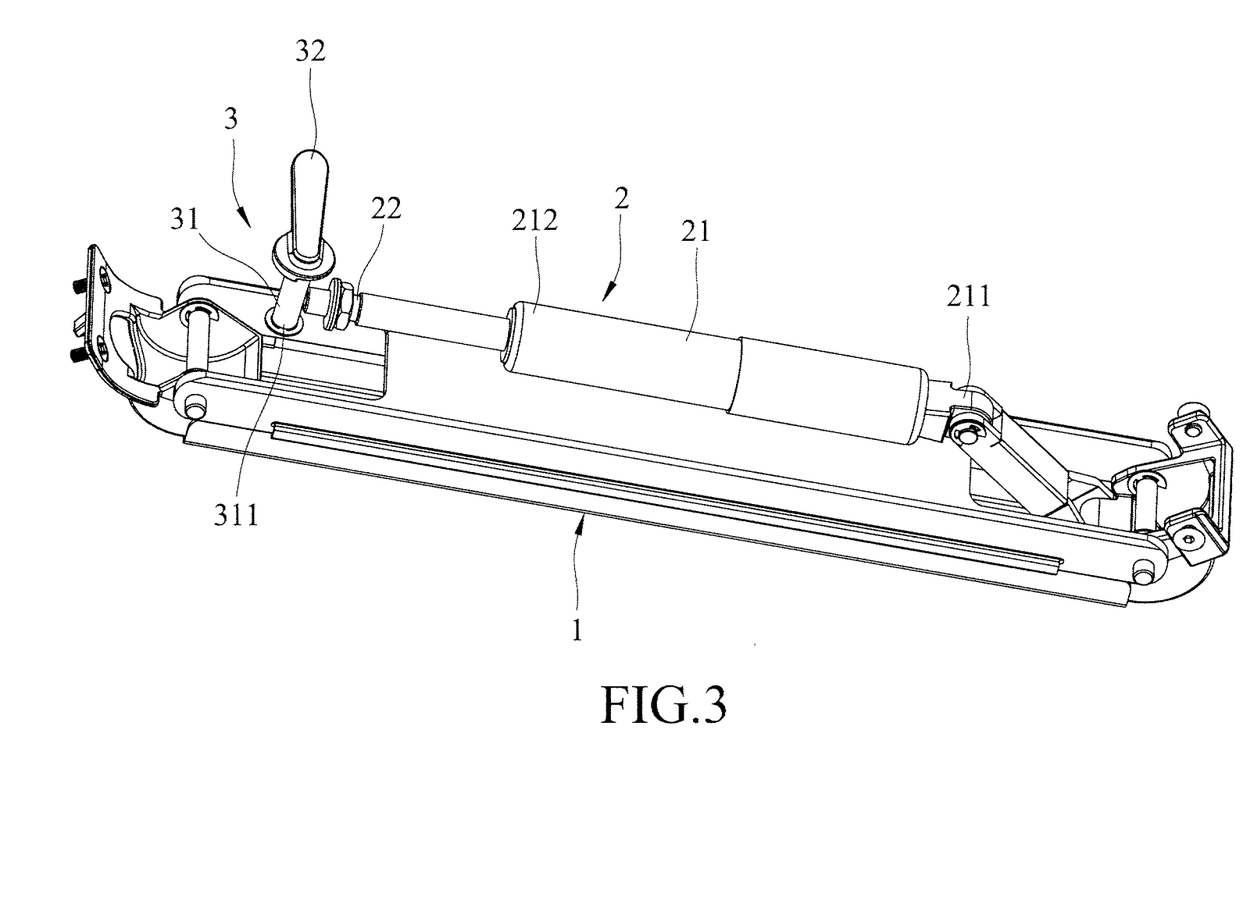
FIG. 3 is a view similar to FIG. 2, but illustrating the control pin in a locking position.
Figure 5:
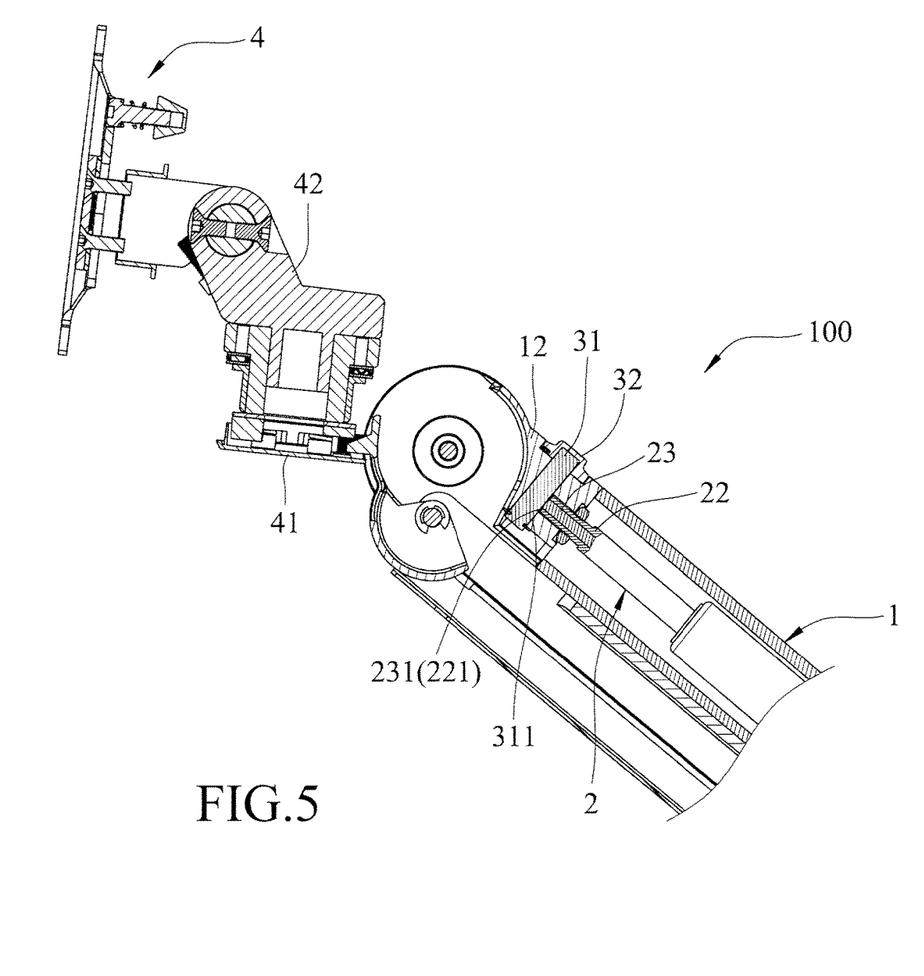
FIG. 5 is a view similar to FIG. 4, but illustrating the control pin in the locking position.

The rotary rod 31 has an outer peripheral surface 311, and a receiving groove 312 indented inwardly from the outer peripheral surface 311. The operating lever 32 is operable to rotate the rotary rod 31 for controlling movement of the control pin 23 between an unlocking position and a locking position. In the locking position, as shown in FIGS. 3 and 5, the end surface 231 of the control pin 23 is flush with the open end 221 of the fixed rod 22, and abuttingly contacts the outer peripheral surface 311 of the rotary rod 31. Further, no pressure difference exists between the chambers of the cylinder body 21. In the unlocking position, as shown in FIGS. 2 and 4, the end surface 231 of the control pin 23 is received in the receiving groove 312, and is spaced apart from the open end 221 of the fixed rod 22. A pressure difference exists between the chambers of the cylinder body 21 when the control pin 23 is in the unlocking position.

Figure 1:
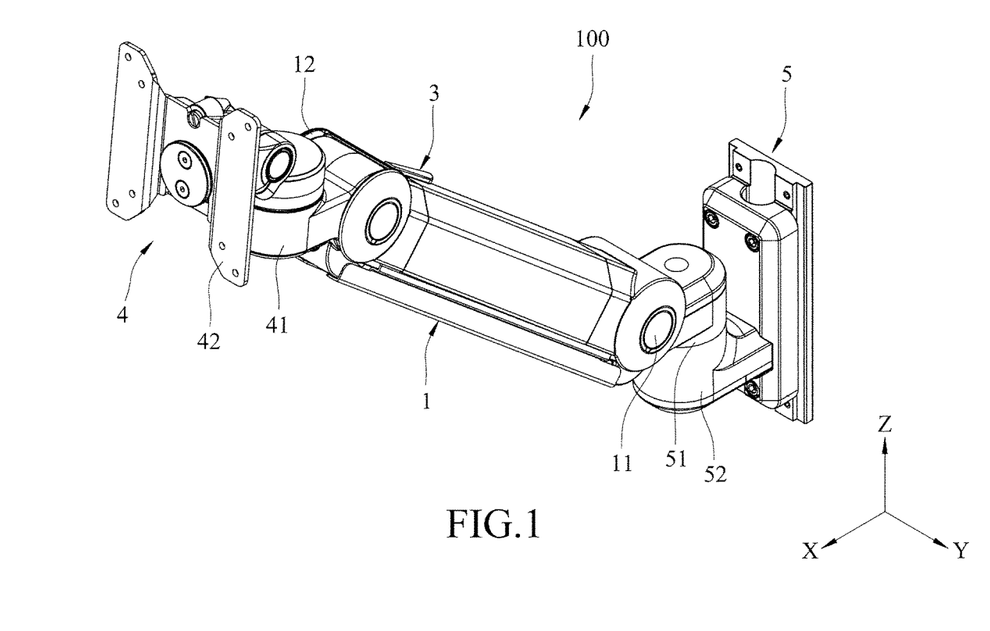
FIG. 1 is a perspective view of a display support device according to a first embodiment of the present disclosure.

The carrier unit 4 includes a carrier connection seat 41 pivotally connected to the movable end portion 12, and a display mounting seat 42 for mounting a display (not shown) thereon. The display mounting seat 42 is inserted into and is rotatable relative to the carrier connection seat 41. As shown in FIG. 1, the display mounting seat 42 is rotatable relative to the carrier connection seat 41 in a plane defined by a first direction (X) and a second direction (Y) transverse to the first direction (X).

Figure 6:
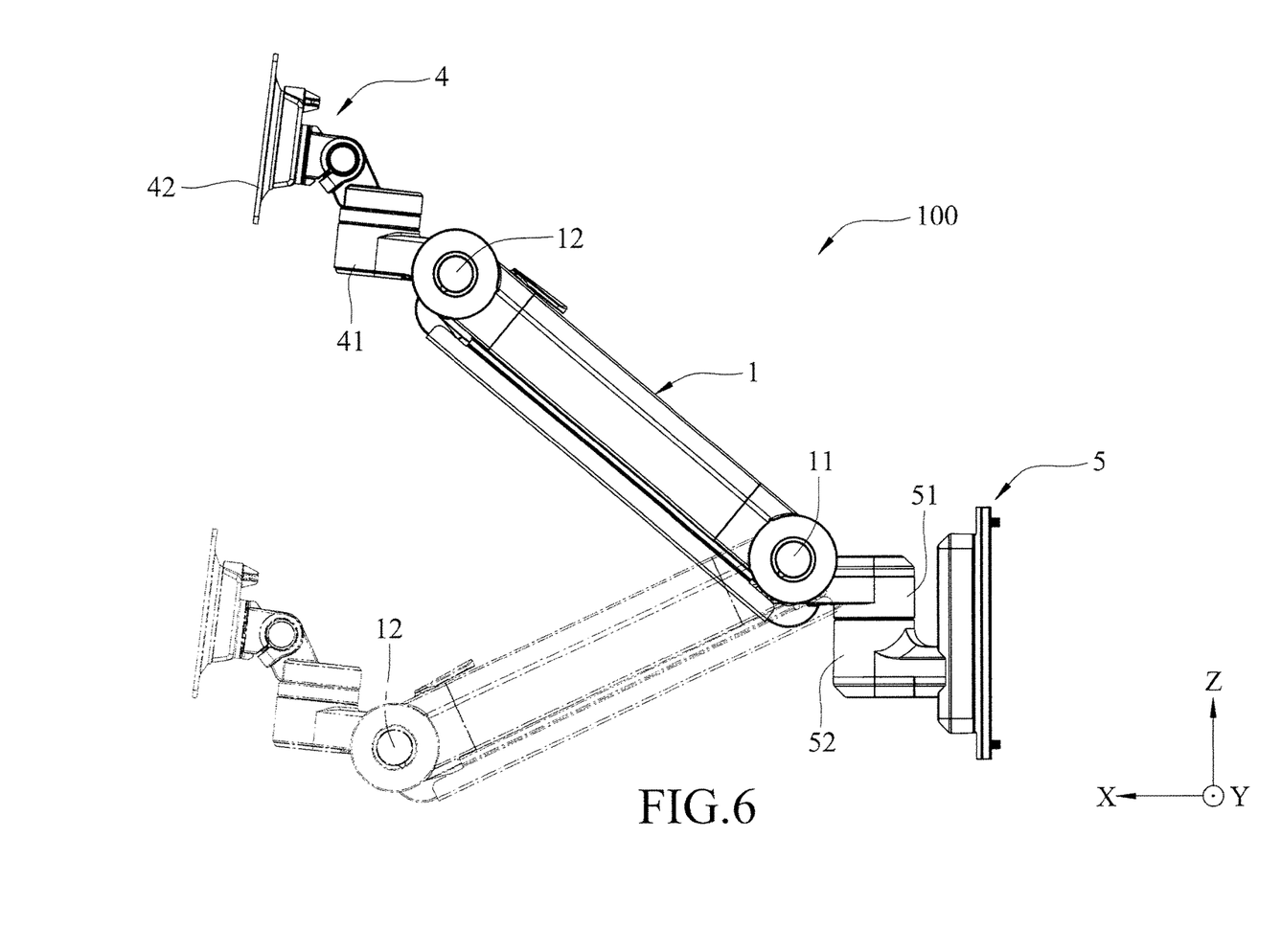
FIG. 6 is a side view of the first embodiment, illustrating a movable end portion of a hanging arm being movable relative to a positioning unit.

The positioning unit 5 includes a positioning connection seat 51 and a fixing seat 52. The pivot end portion 11 is pivotally connected to the positioning connection seat 51. The positioning connection seat 51 is inserted into the fixing seat 52, and is rotatable relative to the fixing seat 52 in the X-Y plane. As shown in FIG. 6, with the connection of the pivot end portion 11 and the positioning connection seat 51, the hanging arm 1 together with the carrier unit 4 is pivotable about the pivot end portion 11 in a plane defined by the first direction (X) and a third direction (Z) transverse to the first and second directions (X, Y), and is rotatable about the positioning connection seat 51 in the X-Y plane.

In use, to position the display to a desired position, the operating lever 32 is operated to rotate the rotary rod 31 and move the control pin 23 out of the receiving groove 312, so that the control pin 23, together with the open end 221 of the fixed rod 22, abuttingly contacts the outer peripheral surface 311 of the rotary rod 31, thereby moving the control pin 23 to the locking position. At this time, because no pressure difference exists inside the cylinder body 21, the cylinder body 21 is immovable relative to the fixed rod 22, and the movable end portion 12 of the hanging arm 11 together with the display is fixed at the desired position.

On the other hand, to change the position of the display, the operating lever 32 is operated again to rotate the rotary rod 31 and move the control pin 23 into the receiving groove 312, so that the end surface 231 of the control pin 23 is spaced apart from the open end 221 of the f fixed rod 22, thereby switching the control pin 23 to the unlocking position. At this time, because a pressure difference exists inside the cylinder body 21, the cylinder body 21 is movable relative to the fixed rod 22, and the movable end portion 12 of the hanging arm 11 together with the display can be adjusted to another desired position.

Figure 7:
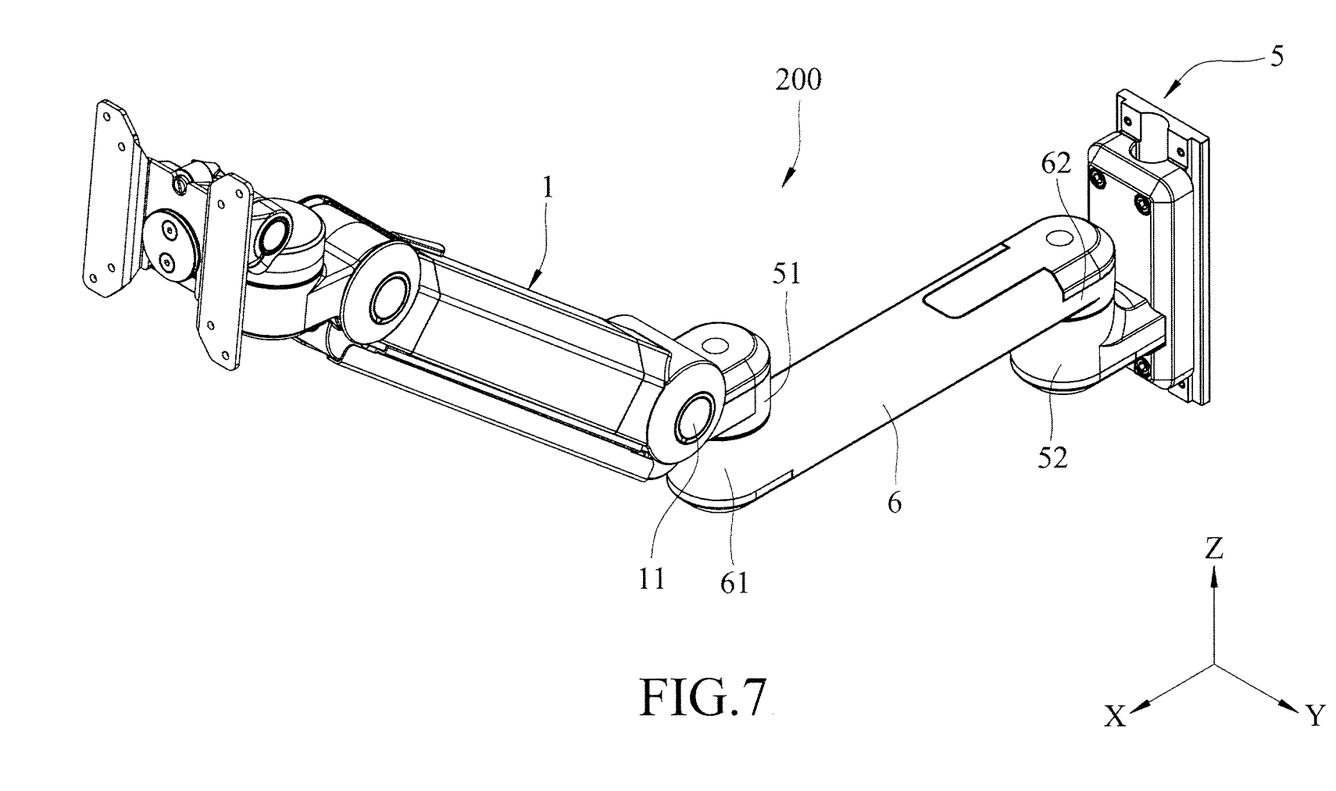
FIG. 7 is perspective view of a display support device according to a second embodiment of the present disclosure.

FIG. 7 illustrates a display support device 200 according to a second embodiment of the present disclosure which is generally similar to the first embodiment. The difference between the first and second embodiments resides in that the display support device 200 of the second embodiment further includes an extension arm 6 that has two opposite ends 61, 62.

In this embodiment, the positioning connection seat 51 is inserted into the end 61 of the extension arm 6, and the end 62 of the extension arm 6 is inserted into the fixing seat 52. Through such connection, the positioning connection seat 51 is rotatable relative to the end 61 of the extension arm 6 in the X-Y plane, and the end 62 of the extension arm 6 is rotatable relative to the fixing seat 52 in the X-Y plane.

The second embodiment can provide the same advantages as the first embodiment.

To sum up, by operating the operating lever 32 to rotate the rotary rod 31 and move the control pin 23 between the unlocking and locking positions, the display can be adjusted and positioned at any desired position.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A display support device, comprising:
   a hollow hanging arm having a pivot end portion and a movable end portion opposite to said pivot end portion;
   a pressure cylinder movably disposed in said hanging arm, and including
     a cylinder body having a first end pivotally connected to said pivot end portion, and a second end opposite to said first end,
     a fixed rod axially extending through said second end of said cylinder body and having an open end opposite to said first end of said cylinder body, and
     a control pin axially and movably extending through said open end of said fixed rod for controlling pressure change inside said cylinder body and having an end surface;
   a control unit operable to control movement of said control pin between a locking position, in which said end surface of said control pin is flush with said open end of said fixed rod and said cylinder body is immovable relative to said fixed rod, and an unlocking position, in which said end surface of said control pin is spaced apart from said open end of said fixed rod and said cylinder body is movable relative to said fixed rod;
   a carrier unit pivotally connected to said movable end portion; and
   a positioning unit connected to said pivot end portion.

2. The display support device as claimed in claim 1, wherein:
   said control unit includes a rotary rod extending transversely through said movable end portion, and an operating lever for controlling rotation of said rotary rod, said rotary rod having an outer peripheral surface, and a receiving groove indented inwardly from said outer peripheral surface;
   when said control pin is in the unlocking position, said end surface of said control pin is received in said receiving groove; and
   when said control pin is switched from the unlocking position to the locking position, said end surface of said control pin is moved out of said receiving groove, and together with said open end of said fixed rod, abuttingly contacts said outer peripheral surface of said rotary rod.

3. The display support device as claimed in claim 2, wherein:

said carrier unit includes a carrier connection seat pivotally connected to said movable end portion, and a display mounting seat that is inserted into and that is rotatable relative to said carrier connection seat; and said positioning unit includes a positioning connection seat and a fixing seat, said pivot end portion being pivotally connected to said positioning connection seat, said positioning connect ion seat being inserted into said fixing seat.

4. The display support device as claimed in claim 1, further comprising an extension arm having two opposite ends, said positioning unit including a positioning connection seat and a fixing seat spaced apart from said positioning connection seat, said pivot end portion being pivotally connected to said positioning connection seat, said positioning connection seat being inserted into one of said two opposite ends of said extension arm, the other one of said two opposite ends of said extension arm being inserted into said fixing seat.

5. The display support device as claimed in claim 4, wherein said carrier unit includes a carrier connection seat pivotally connected to said movable end portion, and a display mounting seat that is inserted into and that is rotatable relative to said carrier connection seat.

\* \* \* \* \*